United States Patent
Krajnc et al.

(10) Patent No.: US 12,401,542 B2
(45) Date of Patent: Aug. 26, 2025

(54) CONTROL MODULE FOR CONTROLLING A SMART HOME DEVICE

(71) Applicant: SIGNIFY HOLDING B.V., Eindhoven (NL)

(72) Inventors: Hugo Jose Krajnc, Eindhoven (NL); Berent Willem Meerbeek, Veldhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 399 days.

(21) Appl. No.: 17/761,408

(22) PCT Filed: Sep. 28, 2020

(86) PCT No.: PCT/EP2020/077025
§ 371 (c)(1),
(2) Date: Mar. 17, 2022

(87) PCT Pub. No.: WO2021/063849
PCT Pub. Date: Apr. 8, 2021

(65) Prior Publication Data
US 2022/0353106 A1    Nov. 3, 2022

(30) Foreign Application Priority Data
Oct. 1, 2019  (EP) .................................... 19200809

(51) Int. Cl.
*H04L 12/28* (2006.01)
(52) U.S. Cl.
CPC ................. *H04L 12/2816* (2013.01)
(58) Field of Classification Search
CPC ..... G06F 9/547; H04L 12/28; H04L 12/2816; H04W 72/00; H05B 47/115; H05B 47/16;
(Continued)

(56) References Cited

U.S. PATENT DOCUMENTS

| | | |
|---|---|---|
| 8,588,339 B2 | 11/2013 | Birru et al. |
| 9,002,522 B2 | 4/2015 | Mohan et al. |

(Continued)

FOREIGN PATENT DOCUMENTS

| | | |
|---|---|---|
| CN | 104865919 A | 8/2015 |
| CN | 204731548 U | 10/2015 |

(Continued)

OTHER PUBLICATIONS

Wang, Weizheng, et al., "Leveraging Smart Lights for Passive Localization," URL: http://www.st.ewi.tudelft.nl/marco/files/passiveLoc_MASS18.pdf, Last Retrieved Mar. 17, 2025 (9 PAGES).

(Continued)

*Primary Examiner* — Ayaz R Sheikh
*Assistant Examiner* — David Zhijun Sun (57) ABSTRACT

The present invention relates to a control module (100) for controlling a smart home device (201), wherein the smart home device is part of a smart home device system (200). The control module comprises a system information providing unit (101) for providing information about the smart home device system, an allocating unit (102) for allocating a part of a technical resource for a function of the smart home device based on the provided information about the smart home device system, and a control unit (103) for controlling the smart home device such that the smart home device uses only the allocated part of the technical resource for executing the function. Thus, the smart home device system can be endowed with the function without noticeably affecting other, in particular preferred, functions of the smart home device system.

8 Claims, 3 Drawing Sheets

(58) Field of Classification Search
CPC .. H05B 47/19; H05B 47/196; H05B 47/1965; H05B 47/197; H05B 47/1975; H05B 47/198; H05B 47/1985; H05B 47/199; H05B 47/1995; Y02B 20/40

See application file for complete search history.

(56) References Cited

U.S. PATENT DOCUMENTS

| | | |
|---|---|---|
| 2009/0185542 A1 | 7/2009 | Zhang et al. |
| 2013/0182566 A1 | 7/2013 | Goergen et al. |
| 2014/0035482 A1 | 2/2014 | Rains, Jr. et al. |
| 2015/0120015 A1 | 4/2015 | Fadell et al. |
| 2015/0241860 A1* | 8/2015 | Raid .................. H05B 47/19 700/275 |
| 2016/0284207 A1* | 9/2016 | Hou ....................... G08C 17/02 |
| 2017/0187809 A1 | 6/2017 | Chen et al. |
| 2017/0272267 A1 | 9/2017 | Köhler |
| 2017/0328997 A1* | 11/2017 | Silverstein .............. G01S 13/87 |
| 2018/0077769 A1 | 3/2018 | Maxik et al. |
| 2019/0036722 A1 | 1/2019 | Singamsetty et al. |
| 2019/0296550 A1 | 9/2019 | Fan et al. |
| 2020/0312121 A1* | 10/2020 | Shiner .................. G08B 26/008 |
| 2022/0210715 A1 | 6/2022 | Deixler et al. |

FOREIGN PATENT DOCUMENTS

| | | |
|---|---|---|
| CN | 109089348 A | 12/2018 |
| JP | 2017528962 A | 9/2017 |
| WO | 2016006060 A1 | 1/2016 |
| WO | WO-2017081513 A1 * | 5/2017 ............... H02J 3/14 |
| WO | 2018054893 A1 | 3/2018 |

OTHER PUBLICATIONS

Yang, Yanbing, et al., "Counting Via LED Sensing: Inferring Occupancy Using Lighting Infrastructure," Sciencedirect, Pervasive and Mobile Computing, 45, 2018 (3 PAGES).

* cited by examiner

CONTROL MODULE FOR CONTROLLING A SMART HOME DEVICE

CROSS-REFERENCE TO PRIOR APPLICATIONS

This application is the U.S. National Phase application under 35 U.S.C. § 371 of International Application No. PCT/EP2020/077025, filed on Sep. 28, 2020, which claims the benefit of European Patent Application No. 19200809.2, filed on Oct. 1, 2019. These applications are hereby incorporated by reference herein.

FIELD OF THE INVENTION

The invention relates to a control module, a method and a computer program product for controlling a smart home device, and to a system comprising at least one smart home device and a control module.

BACKGROUND OF THE INVENTION

Lighting systems do no longer only serve for providing simple illumination in residential environments, but are increasingly endowed with smart functionalities for multiple uses. Exemplary uses of such smart lighting systems include creating an ambiance via suitable modulation of the light output of the lighting system, but also providing notifications or waking up people in a gentle way. Such smart lighting systems typically comprise several light modules capable of running local algorithms and receiving external commands.

Smart homes have not only smart lighting systems installed, but also other smart appliances, ranging from the coffee machine to the washing machine. In some cases, smart appliances are actually conventional appliances that are only rendered smart by the use of smart plugs and/or smart switches, which may be thought of as smart control elements for the appliances. A smart plug is typically capable of receiving external commands which it interprets to control the appliance plugged into it, and a smart switch can typically be used like a conventional switch, but is typically capable of transmitting corresponding control commands to an appliance without being restricted to be electrically coupled to the appliance. Hence, for example, a system of conventional light modules may be rendered smart by controlling the light modules with smart plugs or smart switches.

Under certain circumstances, it may be desirable to put smart devices, such as smart lighting systems, smart plugs or smart switches, to a new use. This may be the case if the smart device was not initially designed so as to serve that use, a reason for which may be that that use was not thought of, or it was thought of but purposefully not further considered in order to save costs. In order to put a system of smart devices to a new use, the system may first need to be endowed with new functionalities that facilitate the new use. However, a system of smart devices might not have sufficient resources at its disposal or might inefficiently use them, such that it cannot be endowed with the further functionality, or only at the cost of a decreased performance with respect to functionalities already present. It would therefore be desirable if smart home systems could be endowed with further functionalities, particularly without changing their structural components and without noticeably or negatively affecting their performance with respect to existing functionalities.

Since the detection of the presence of persons is particularly favorable in smart homes in order to control smart devices based thereon, it would be specifically desirable if a presence detection function could be deployed in existing smart devices without having to structurally change them and without noticeably or detrimentally affecting an overall performance of the system.

SUMMARY OF THE INVENTION

It is an object of the present invention to provide a control module, a system, a method and a computer program that allow the system to execute a further function without affecting its performance with respect to existing functions, in particular existing preferred functions.

In a first aspect, the present invention relates to a control module for controlling a smart home device, wherein the smart home device is part of a smart home device system, the control module comprising a) a system information providing unit for providing information about the smart home device system, b) an allocating unit for allocating a part of a technical resource for a function of the smart home device based on the provided information about the smart home device system, and c) a control unit for controlling the smart home device such that the smart home device uses only the allocated part of the technical resource for executing the function.

Since the system information providing unit provides information about the smart home device system, knowledge about a state and a configuration of the smart home device system can be accessed, and therefore also knowledge about a need for performance with respect to existing functions, in particular preferred existing functions, of the smart home device system and about a freedom to redistribute a load carried by the constituents of the smart home device system for achieving the needed performance. Since the allocating unit allocates a part of the technical resource for a function of the smart home device based on the provided information about the smart home device system, wherein the control unit controls the smart home device such that the smart home device uses only the allocated part of the technical resource for executing the function, a technical load carried by the smart home device with respect to the function can be adapted in accordance with the knowledge about the state or configuration of the smart home device system, so that the smart home device system can be endowed with the function without noticeably affecting other, in particular preferred, functions of the smart home device system.

The smart home device system may comprise one or more smart home devices, wherein each of the smart home devices comprises a smart home device communication unit for communicating with the control module and the other smart home devices of the smart home device system.

The smart home device communication unit is adapted to receive and send wireless or non-wireless signals. Wireless signals are in this context understood to refer to electromagnetic radiation non-perceivable by the human eye, such as radiofrequency signals. For instance, the smart home device communication unit can comprise a smart home device transceiver for receiving and transmitting wireless signals according to the ZigBee standard, or any other standard for wireless communication, such as an IEEE 802.11 standard, Bluetooth, Bluetooth Mesh, Z-Wave, Thread, etc.

A smart device may generally be defined as being distinct from a conventional device in that it comprises, besides means for executing a primary device function, a communication unit for communicating with other smart devices and/or for decreasing the need for active user interaction with the smart device. In particular, a smart home device may be defined as being a device whose primary functions serve a domestic use and that comprises communication means that go beyond this domestic use, wherein the communication means are adapted for communicating with other smart home devices and/or for decreasing the need for active user interaction with the smart home device.

The smart home devices are preferably smart plugs, smart switches or smart light modules, wherein smart light modules may also be conventional light modules connected to a power source via a smart plug and/or controlled by the use of a smart switch. A smart plug may be defined as a smart device via which another electric device may be connected to a power source, thereby endowing the electric device with an additional communication function, in particular with a remote control and/or network communication function. A smart switch may be defined as being a smart device that may be mounted in the neighborhood of, particularly in wireless connection with, another device, wherein the switch is adapted to control the other device depending on a mechanical manipulation of the smart switch, such as turning or pressing, wherein, preferably, the smart switch is adapted to use the mechanical manipulations as its sole source of power.

The smart home devices may however also be other devices different from general purpose processing devices like computers or smartphones. In particular, the smart home devices may also be conventional appliances connected to a power source via a smart plug and/or controlled by the use of a smart switch. In the context of these particular examples, the smart home device communication unit can equivalently be referred to as a smart plug communication unit, a smart switch communication unit or a smart light module communication unit, etc.

The smart light modules preferably each comprise, in addition to the communication unit, a light unit. A light unit of a smart light module preferably comprises light emitting means for emitting visible light, i.e. electromagnetic radiation perceivable by a human eye. The light emitting means preferably comprise an LED, but can also comprise an incandescent or fluorescent light bulb, for instance. If the smart light module is a conventional light module connected to a power source via a smart plug and/or controlled by the use of a smart switch, the light unit may be the light unit of the conventional light module.

The smart light module may be adapted to control a light output of the light unit based on the wireless or non-wireless signals received by the smart light module communication unit, wherein the light output is controlled with respect to an intensity and/or a wavelength of the emitted light.

The control module is adapted to control one or more smart home devices of the smart home device system. The smart home device system can comprise the control module, and possibly further control modules. Each of the one or more control modules of the smart home device system preferably comprises a control module communication unit for communicating with the smart home devices of the smart home device system and, possibly, the other control modules. The control module communication unit is adapted to receive and transmit wireless or non-wireless signals. For instance, the control module communication unit can comprise a control module transceiver for receiving and transmitting wireless signals according to the ZigBee standard, or any other standard for wireless communication, such as an IEEE 802.11 standard, Bluetooth, Bluetooth Mesh, Z-Wave, Thread, etc. Communication between a control module and a smart home device preferably comprises an exchange of wireless or non-wireless signals between the control module communication unit and the smart home device communication unit. In some embodiments, one or more of the smart home devices may comprise the control module controlling them, i.e., for instance, each smart home device may comprise a control module controlling the smart home device. If a smart home device comprises a control module controlling the smart home device, the smart home device communication unit and the control module communication unit may be a single unit.

The control module may also be located in the cloud, such as on one or more servers, for instance. In that case, the control module communication unit may comprise means via which a user of the smart home device is connected to the cloud, such as, for instance, a router via which he/she is connected to the Internet.

The system information providing unit is adapted to provide information about the smart home device system. The system information providing unit can be, for instance, a storage unit storing the information about the smart home device system, or it can be connected to a storage unit storing the information about the smart home device system. The system information providing unit can also be connected to an input providing unit, such as a user interface, via which a user can directly input the information about the smart home device system. Also, the system information providing unit may have access to the control module communication unit, wherein the wireless or non-wireless signals received by the control module communication unit, and possibly provided by a user, may comprise the information about the smart home device system, wherein the system information providing unit may be adapted to retrieve the information about the smart home device system by accessing the control module communication unit. Information about the smart home device system is understood to be information about the smart home device system as a whole and/or its constituents, such as the one or more smart plugs, smart switches and/or smart light modules. The system information may relate to an internal state of the smart home device system, but also to a configuration with respect to the environment in which the smart home device system is set up. It may also relate to other characteristics of the smart home device system, such as a number and/or type of smart home devices modules making up the smart home device system, desirable performance indicators, like a maximum tolerable reaction speed to user commands, or tolerable artefacts in a light output generated by one or more smart light modules of the smart home device system. The information about the smart home device system may have been acquired by the smart home device system itself, i.e., for instance, via communication between its smart home devices.

The allocating unit is adapted to allocate a part of a technical resource for a function of the smart home device based on the provided information about the smart home device system. Allocating a part of the technical resource refers to reserving a part of the technical resource for access by only predetermined components of the smart home device and/or for only predetermined uses. Which part is allocated, in particular the size of the part, may be determined by the allocation unit by applying predetermined rules or by accessing stored tables, wherein the rules or tables relate information about the smart home device system to parts of the technical resource to be allocated.

A technical resource may be a technical resource of a smart home device, i.e. any limited hardware or software component of the smart home device. Typically, the technical resource is accessed by more than one other component of the smart home device and/or for executing more than one function. Examples of technical resources are a processing speed of the smart home device, such as for processing control commands, a power consumption, i.e. a consumption of power provided by a power source of the smart home device, a communication speed of the smart home device communication unit, such as a bandwidth of its smart home device transceiver, or any combination of these.

A technical resource may also be an amount of time, such as an available idle and/or busy time, which may be indicative of when a function of the smart home device is to be executed, wherein an idle time refers to a time in which the smart home device is not performing one of its function or is not performing all of its functions. In particular, an idle time can be determined for a function sharing a technical resource with a function for which a part of the technical resource should be allocated. For instance, an idle time can be a time in which the smart home device is not using a bandwidth of its transceiver for communication with other smart home devices, wherein during such an idle time the bandwidth can be used for other functions.

Allocating a part of the technical resource for one function may imply that other parts of the technical resource can be employed for executing other functions. In particular, by decreasing a part of the technical resource allocated for a function by a certain amount, this amount of the technical resource may be used for other functions. In this sense, the allocating unit may be adapted to allocate a part of the technical resource for each function of the smart home device that uses this resource, thereby allocating a balance, preferably an optimal balance, of loads with respect to the different functions. Herein, a balance is understood to be optimal if the smart light module or the overall lighting system performs with a sufficient performance with respect to all of its functions, wherein a sufficient performance is defined as a performance that deviates from a maximum performance by a degree that is not noticeable by the user of the smart home device and still manages to fulfill a desired functionality. For instance, the technical resource is accessed by the smart home device communication unit and by a further unit of the smart home device, wherein the smart home device communication unit preferably accesses the technical resource for receiving control signals, and the further unit preferably accesses the technical resource for a function that goes beyond the communication function of the smart home device communication unit. Instead of being executed by a separate unit, the further function may also be executed by the smart home device communication unit as well. In that case, the smart home device communication unit accesses the technical resource for executing two functions.

A part of a technical resource allocated for a function of the smart home device may be smaller or larger than a reference value, wherein the reference value is one of the following: a part of the technical resource that was previously allocated for the function of the smart home device; a part of the technical resource allocated for one or more other functions of the smart home device; a part of the technical resource that is to be allocated for one or more other functions of the smart home device; a part of the technical resource allocated for a function of the one or more other smart home devices, wherein the function of the one or more other smart home devices may be, or correspond to, the function of the smart home device for which a part of the technical resource is to be allocated; a part of the technical resource that is to be allocated for a function of one or more other smart home devices, wherein the function of the one or more other smart home devices may be, or correspond to, the function of the smart home device for which a part of the technical resource is to be allocated. The parts of the technical resources of the smart home devices may be measured and compared in relative terms, i.e. with respect to the respective technical resource, or in absolute terms. The relative terms may include percentage values, and the absolute terms may include physical dimensions, like an amount of information, an amount of information per time, an amount or interval of time, a current, an energy or a power. Whenever reference is made herein to terms like "smaller" or "larger", if not stated otherwise, any of the above definitions can apply.

The control unit is adapted to control the smart home device such that the smart home device uses only the allocated part of the technical resource for executing the function. For instance, the control unit may be adapted to access the control module communication unit for sending wireless or non-wireless control signals receivable by the smart home device communication unit, wherein the control signals may indicate to the smart home device that, from receipt of the control signals on, only the allocated part of the technical resource is to be accessed for executing the function. The control unit may in some cases also be part of the control module communication unit. Hence, in cases where the control module is integrated in a smart home device it is adapted to control, the control unit may be part of the smart home device communication unit, and the control module communication unit can be omitted. Also, the control signals may in some cases be part of the communication signals. In particular, also the wireless control signals may be transmitted according to the ZigBee standard, for instance, or any other standard for wireless communication, such as an IEEE 802.11 standard, Bluetooth, Bluetooth Mesh, Z-Wave, Thread, etc. The function for which the part of the technical resource is allocated may be any function executed by the smart home device, either autonomously or in the context of the smart home device system. Functions executable by the smart home device include running local algorithms, running parts of global algorithms run by the smart home device system, detecting a movement in an environment of the smart home device system, and/or, in case the smart home device system is a smart lighting system comprising one or more smart light modules, contributing to light effects to be produced by the lighting system, such as dynamic light effects in pixelated luminaires or 3D lighting systems. Preferably, the function for which a part of the technical resource is allocated is a function that contributes to a use of the smart home device system that goes beyond uses that the smart home device system is known to achieve and/or in which the smart home device system is known to perform well. It may also be preferred that the function is a function that contributes to a use of the smart home device system that goes beyond standard uses. In the case of a smart lighting system, the standard uses may comprise, for instance, turning light on and off, dimming light and/or changing the color of the light, so that the function for which a part of the technical resource is allocated is preferably not a standard communication and/or light control function contributing to theses standard uses. However, in the above explained sense in which allocating a part of a technical resource for one function may imply that a remaining part is allocated for other functions, the function for which a part of the technical resource is allocated may also be a function that contributes to a use that the smart home device system is known to achieve and/or in which the smart home device system is known to perform well. Uses that a smart lighting system is known to achieve and/or in which a smart lighting system is known to perform well may comprise generating a predetermined light output according to a user command, for instance. Uses that go beyond such known uses may comprise, for instance, generating more complex, possibly dynamic and/or non-predetermined light effects.

In an embodiment, the smart home device system is a smart lighting system, and the function for which the part of the technical resource is allocated comprises contributing to a collective light effect of the system, preferably a collective light effect that varies in time. In this case, the function for which the part of the technical resource is allocated can be referred to as a light effect function. The technical resource allocated for the light effect function may be one or more of a processing speed, a power consumption, an available idle and/or busy time or a communication speed of the smart light module communication unit, such as a bandwidth of its smart light module transceiver, or any combination of these.

In a preferred embodiment, the function for which the part of the technical resource is allocated is a detection function, the detection function comprising presence detection in an environment of the smart home device system. In this case, the function for which the part of the technical resource is allocated can be referred to as a detection function. The technical resource allocated for the detection function may be one or more of a processing speed, a power consumption, an available idle and/or busy time or a communication speed of the smart home device, such as a bandwidth of its smart light module transceiver, or any combination of these. The environment of the smart home device system may be a region in space penetrated by the detection signals. The presence detection according to the detection function preferably comprises detecting a presence and/or a movement of a human being, but the presence and/or movement could also be a presence and/or movement of an animal or an inanimate object.

If the smart home device is a smart light module, it is preferably adapted to change its light output in reaction to detecting a presence and/or movement. The detection function then has the advantage that the smart lighting system requires less manual interaction for being controlled. For instance, a person entering an environment of the smart lighting system, such as a room in a building, may be detected by a smart light module of the smart lighting system, whereupon the smart light module may illuminate the environment such that the person, without having to actively or manually interact with the smart lighting system, can visibly orient him or herself in the environment. Once the person leaves the environment, i.e. the room of the building, for instance, the smart light module may terminate illumination of the environment, so that, without the need for manual interaction, energy needed for the generation of light is saved. The detection function may also be employed for use in security applications. Also in this case, the technical resource may be one or more of a processing speed, a power consumption, an available idle and/or busy time or a communication speed of the smart home device, i.e. the smart light module in this case, such as a bandwidth of its smart light module transceiver, or any combination of these.

In a preferred embodiment, the technical resource is a transceiving rate of a smart home device transceiver, wherein the smart home device transceiver is a transceiver of the smart home device, wherein the smart home device is adapted to receive and transmit communication signals and detection signals via the smart home device transceiver, wherein the communication signals comprise control signals, and the detection signals are received and transmitted for executing the detection function. If the smart home device is a smart plug or a smart switch, then the control signals affect a primary function of the appliance the smart plug is connected to and/or the smart switch is adapted to control, respectively. If the smart home device is a smart light module, the control signals affect a light output of the smart light module. The detection signals serve for executing the detection function. The smart home device, in particular the smart light module, may alternatively be adapted to not transmit communication signals, i.e. it may be adapted to only receive the communication signals and to receive and transmit the detection signals. In some embodiments, the communication signals and the detection signals jointly form part of an overall network traffic. The smart home device transceiving rate is a measure of a total amount of signals the smart home device transceiver is adapted to transceive in a given amount of time. That is, the smart home device transceiving rate is the sum of a number of signals received by the smart home device transceiver and a number of signals transmitted by the smart home device transceiver in the given amount of time. Accordingly, transceiving is understood herein as the activity of receiving and transmitting, wherein in a preferred embodiment at any point in time, it is either only being received or only being transmitted, wherein the transceiver can be adapted to schedule the transmitting and receiving such that it can be regarded as substantially simultaneous transmitting and receiving. In other embodiments, the transceiver can be adapted to transmit and receive at the same time. The smart home device transceiver has a maximum smart home device transceiving rate, given, for instance, by the sum of a maximum receiving rate of the smart home device and a maximum transmitting rate of the smart home device, which might be different from each other. In other words, the smart home device transceiver is not capable of transceiving an arbitrarily large amount of signals in a given amount of time. The maximum smart home device transceiving rate may be a bandwidth, i.e. a physical bandwidth, of the smart home device transceiver. However, the maximum smart home device transceiving rate may also be a restricted bandwidth, i.e. smaller than the physical bandwidth, of the smart home device transceiver, wherein the restricted bandwidth may have been assigned to the smart home device transceiver by the control module. Then, a part of the technical resource allocated for a function of the smart home device may be referred to as a partial bandwidth for that function. For instance, a partial bandwidth may be allocated for the detection function, leaving the rest of the overall bandwidth for communication. For instance, a partial bandwidth of one half, i.e. one half of the maximum smart home device transceiving rate of the smart home device transceiver, would indicate that only half of all signals received and transmitted via the smart home device transceiver are detection signals, and a partial bandwidth of zero would indicate that the smart home device transceiver neither receives nor transmits any detection signals. In some embodiments, the smart home device transceiver comprises a receiver and a transmitter, wherein the receiver receives signals like the smart home device transceiver described above, and the transmitter transmits signals like the smart home device transceiver described above.

The signals received by the smart home device transceiver are preferably wireless signals, wherein the smart home device transceiver may be adapted to convert the signals into non-wireless signals, wherein the converted non-wireless signals may be represented by bits. Likewise, the smart home device transceiver may be adapted to transmit wireless signals that have previously been converted by the smart home device transceiver from non-wireless signals that may have been represented by bits. The communication signals preferably comprise received control signals, wherein the received control signals are preferably generated by a control module of the smart home device system for controlling the smart home device. For instance, a smart light module may be adapted to control a light output generated by the light unit of the smart light module in accordance with information encoded in a control signal received via the smart light module transceiver. In a smart lighting system, the transmitted control signals preferably affect a light output of another smart light module in the smart lighting system. The detection signals are preferably wireless signals. For instance, both the communication signals and the detection signals are radio signals, i.e. electromagnetic radiation with a radiofrequency. Preferably, the transmitted detection signals are received via a smart home device transceiver of another smart home device of the smart lighting system, wherein the other smart home device or the control module of the smart home device system may be adapted to detect movement in between the smart home device and the other smart home device based upon the detection signals transmitted by the smart home device and received by the other smart home device. The smart home device may also be adapted to receive the detection signals sent out by itself after they have been reflected at objects in the environment of the smart home device system. In this case, the smart home device or the control module of the smart home device system may be adapted to detect a presence and/or movement in the environment of the smart home device system based upon the detection signals that have been transmitted by the smart home device itself.

In a preferred embodiment, the control module further comprises a scheduling unit for determining a time schedule according to which the smart home device is to execute the detection function, wherein the control unit is adapted to control the smart home device such that it executes the detection function in accordance with the time schedule. Preferably, the scheduling unit is adapted to determine the time schedule further in accordance with time schedules according to which other smart home devices of the smart home device system execute the detection function. For instance, the time schedules for two smart home devices of the smart home device system may be determined such that detection signals are transmitted by the two smart home devices in an interleaved way, i.e. such that at any time only one of the two smart home devices receives or transmits a detection signal while the other one only receives or transmits other than detection signals or no signals at all. More particularly, the time schedules of the two smart home devices may be corrected for a propagation time a detection signal needs for propagating from one smart home device to the other. It is also possible that the time schedules provide detection windows, wherein the windows refer to predetermined time intervals in which only one or the other smart home device receives and transmits detection signals, wherein the detection signals transceived in a single time window may be a plurality of detection signals.

In an embodiment, the scheduling unit is adapted to determine a time schedule according to which any number of smart home devices of the lighting system is to execute the detection function, wherein the control unit is adapted to control the smart home devices such that they execute the detection function in accordance with the time schedule. The time schedule may in this case be a single global time schedule for each of the smart home devices, or it may in fact be a set of local time schedules, wherein each local time schedule determines operation of one of the smart home devices, and in which case it is understood that the different local time schedules depend at least partially on each other. The smart home devices may be divided into groups, wherein the time schedule may be such that detection signals are transmitted in an interleaved way within each group, i.e. such that at any time only one smart home device of the group receives or transmits detection signals while the others only receive or transmit other than detection signals or no signals at all. In the case of more than one group of smart home devices, the time schedule may therefore allow simultaneous transmission of detection signals by smart home devices of different groups.

In a preferred embodiment, the control module further comprises a variance determining unit that is adapted to determine a relative or absolute variance in the detection signals received by a smart home device, wherein the information about the smart home device system comprises this relative or absolute variance, wherein the allocating unit is adapted to allocate the part of the technical resource based on the determined relative or absolute variance.

The relative variance is a variance between the detection signals received by the smart home device and another smart home device of the smart home device system over time. If, for instance, the relative variance is low, it may be determined that a distance between the smart home device and the other smart home device is small, i.e. it is assumed that the distance between the two smart home devices is below the predetermined threshold referred to in a previous embodiment. For example, if the detection signals received by the two smart home devices have never differed in intensity by more than five percent over the last twenty-four hours, due to their assumed proximity the allocating unit may allocate zero partial bandwidth of the smart home device transceiver of one smart home device for the detection function while the partial bandwidth of the smart home device transceiver of the other smart home device allocated for the detection function remains unchanged. In fact, assuming or determining that a distance between two smart home devices is below a predetermined threshold based on the relative variance in detection signals received by the two smart home devices being low may also be omitted. Then, for instance, if the detection signals received by the two smart home devices have never differed in intensity by more than five percent over the last twenty-four hours, the allocating unit may allocate zero partial bandwidth of the smart home device transceiver of one smart home device for the detection function while the partial bandwidth of the smart home device transceiver of the other smart home device allocated for the detection function remains unchanged, wherein this choice of allocation is independent on the relative distance between the two smart home devices.

The absolute variance is a variance of the detection signals received by the smart home device alone over time. If, for instance, the absolute variance is low, it may be determined that the smart home device is generally unsuitable for executing the detection function, in particular if movement has been detected by other smart home devices during the time over which the absolute variance has been determined to be low. In this way, smart home devices that are unsuitable for executing the detection function are granted larger parts of a technical resource for other functions without risking that the detection function decreases in performance. For example, if the intensity of the detection signals received by a smart home device has not changed over the last twenty-four hours while the intensity of the detection signals received by another smart home device has, the allocating unit may allocate zero partial bandwidth of the smart home device transceiver for the detection function.

In a preferred embodiment, the information about the smart home device system comprises information about a spatial arrangement of the smart home device system, wherein the allocating unit is adapted to allocate the part of the technical resource based on the information about the spatial arrangement. The spatial arrangement may comprise a location of the smart home device with respect to one or more other smart home devices, a location of one or more other smart home devices with respect to other smart home devices of the smart home device system, a distance between the smart home device and one or more other smart home devices, and/or a distance between one or more other smart home devices. Preferably, the distance between a smart home device and another smart home device is a spatial distance between the smart home device transceivers of the two smart home devices.

In an embodiment, the information about the smart home device system comprises allocation information, wherein the allocating unit is adapted to allocate the part of the technical resource based on the allocation information, wherein the allocation information is indicative of a part of the same or another technical resource allocated for another smart home device of the smart home device system for the function for which the part of the technical resource of the smart home device is allocated. Preferably, the information about the smart home device system comprises allocation information and the distance between the smart home device and the other smart home device of the smart home device system. In that case, if the distance is below a predetermined threshold, the control module may be adapted to choose a part of the technical resource to be allocated for the function of the smart home device whose size is smaller than the part of the same or corresponding technical resource allocated by the other smart home device for the function. More generally, if the distance is below a predetermined threshold, the control module may be adapted to choose a part of the technical resource to be allocated for the function of the smart home device whose size is inversely related to the size of the part of a technical resource allocated for the function for the other smart home device, i.e. that is the smaller the larger the part allocated for the other smart home device is, and the larger the smaller the part allocated for the other smart home device is. For instance, the inverse relationship may be additive, i.e. the sizes of the parts of the technical resources allocated for the two smart home device may add up to a fixed value. The fixed value may be such that the two smart home device jointly execute the function optimally, i.e., for instance, with a sufficient performance. In particular, if the two smart home device are within a close range of one another, i.e. if the distance between the two smart home device is below the predetermined threshold, then the control module may be adapted to set the part of the technical resource allocated for the smart home device for the function to zero if the corresponding part allocated for the other smart home device is sufficient for executing the function. This is particularly advantageous in the case that the function for which the part of the technical resource is allocated is the detection function and if the regions of the environment in which the two smart home devices are adapted to detect a presence and/or movement are substantially the same. This is because detection results of the two smart home devices would then be substantially the same, so that, by having only one of the smart home devices execute the detection function, the other smart home device is granted an additional part of a technical resource for other purposes without detrimentally, or noticeably, affecting a performance of the detection function. Moreover, having the detection function executed on two relatively close smart home devices, the overall detection function of the smart home device system would be unnecessarily degraded in performance due to signal collisions and delays, for instance.

In a preferred embodiment, the information about the smart home device system comprises information about a delay between a control signal provided for the smart home device and a corresponding response by the smart home device, wherein the allocating unit is adapted to allocate the part of the technical resource based on the information about the delay. Delays between control signals provided for a smart home device and corresponding responses by the smart home device may arise if an overall amount of signals provided for the smart home device is such that the technical resource is not sufficient for the smart home device to process all of them in real time. For instance, a bandwidth of a smart home device transceiver may not be large enough to process all signals provided for the smart home device in real time. A delay may also arise if a partial amount of signals is such that the part of the technical resource allocated for signals of that kind is not sufficient for processing the partial amount of signals in real time. For instance, the partial bandwidth of a smart home device transceiver allocated for communication may not be large enough to process all communication signals, in particular control signals, provided for the smart home device in real time.

The information about the delay may comprise an estimated or measured value of the delay, wherein the estimation or the measurement may have been performed based on prior knowledge and/or may be performed in real time by the control module. For this purpose, the control module may comprise a delay determination unit that is adapted to estimate and/or measure a value of the delay between a control signal provided for the smart home device and a corresponding response by the smart home device. The corresponding response is understood to be a reaction of the smart home device that is in accordance with a command delivered by the control signal. For instance, if the control signal is provided for a smart light module and indicates that the light unit of the smart light module is to change its light output, the corresponding response would be this change in light output. The change in light output may be a change from no light output to light output with an intensity indicated by the control signal, or a change in light output color as indicated by the control signal. Preferably, in this case, the value of the delay is the length of the time interval between the generation of the control signal at the control module and the point in time at which the change in light output is completed. This length may be estimated, i.e. by the delay determination unit, for instance, by subtracting times indicated by a first and a second clock signal, wherein the first clock signal may be the control signal commanding the change in light output of the smart light module and the second clock signal may be a response signal that may be transmitted by the smart light module to indicate that the smart light module is to respond to the command. More generally, the value of the delay may also be estimated based on prior knowledge about a tendency of the smart home device to be delayed. For instance, if a given smart home device has been frequently delayed in the past, the allocation unit may allocate a smaller partial bandwidth of the smart home device transceiver for the detection function than if the smart home device had never or only rarely been delayed before. Measurement of the delay may also be performed, i.e. by the delay determination unit for instance, by subtracting times indicated by a first and a second clock signal, wherein, as for estimation, the first clock signal may be the control signal commanding the change in light output of a smart light module, but the second clock signal may, for delay measurement, be generated by a light detector adapted for detecting an intensity and color of light if the light detector detects that the light output has changed as commanded by the control signal. A light color is herein understood as a spectral characteristic of the light, such as an integral over a spectral power distribution, a normalized spectral power distribution, or a color temperature.

In a preferred embodiment, the information about the smart home device system comprises information about a delay between a control signal provided for another smart home device of the smart home device system and a corresponding response by the other smart home device, wherein the control unit is adapted to control the smart home device so as to respond to control signals provided for the other smart home device based on the information about the delay of the other smart home device, wherein the response is such that it diminishes an effect of the delay of the other smart home device on a light output of the smart home device system. In this embodiment, at least the delayed smart home device is preferably a smart light module. The delay of all smart home devices of the smart home device system may be computed analogously. That is to say, the information about the delay of the other, or any, smart home device of the smart home device system may comprise an estimated or measured value of the delay, wherein the estimation or the measurement may have been performed based on prior knowledge and/or may be performed in real time by the control module. For this purpose, the control module may comprise a delay determination unit that is adapted to estimate and/or measure a value of the delay between a control signal provided for the other, or any, smart home device of the smart home device system and a corresponding response by the respective smart home device, wherein the corresponding response is understood to be a reaction of the respective smart home device that is in accordance with a command delivered by the control signal, such as a change in light output as described above for the case of the smart home device being a smart light module. Preferably, in that case, also the value of the delay for the other, or any, smart light module of the smart lighting system is the length of the time interval between the generation of the control signal for the respective smart light module at the control module and the point in time at which the change in light output of the respective smart light module is completed, in which case also the estimation and/or measurement of the value of the delay for the other, or any, smart light module of the smart lighting system may be performed as described above.

The light output of a smart lighting system is preferably indicative of the sum of the light outputs of all smart light modules of the smart lighting system. Hence, according to this embodiment, if the control module determines that a given smart light module is delayed, i.e. that it will generate light output changes only after a given delay time in response to control signals generated by the control module for this delayed smart light module, the control module may control another smart light module to mimic the effect the changed light output of the delayed smart light module would have had on the light output of the smart lighting system. Once the control module determines that the delayed smart light module is no longer delayed, the control module may control the mimicking smart light module to no longer mimic that effect. In this way, a light output performance may be preserved without allocating less of a technical resource for a further function, like a detection function, and therefore without negatively affecting detection results.

In a preferred embodiment, the information about the smart home device system comprises information about a function of a smart home device within the smart home device system, wherein the allocating unit is adapted to allocate the part of the technical resource based on the information about the function. In case of the smart home device being a smart lighting module of a smart lighting system, the function may be a lighting function, and the information about the function of the smart light module within the smart lighting system may comprise a characteristic of a light output of a smart light module. A characteristic of a light output may be a light intensity, a light color or a degree of directedness of the light output. The degree of directedness may range from high, such as for a spot light with a small and sharp light spot, to low, such as for diffuse light with no noticeable focus. A smart light module of the smart lighting system may be adapted to generate a light output with a particular light color, a particular light intensity and/or a particular degree of directedness in order to contribute to a particular desired light output of the smart lighting system, in which case the particular light color, light intensity and/or degree of directedness would constitute information about the lighting function of the smart light module within the smart lighting system. Information about the lighting function of the smart light module within the lighting system may also be more high level, i.e., for instance, comprise a linguistic description of the lighting functions such as "main", "ambience", "spot", "dynamic", etc. For instance, the smart light module may generate ambient light, i.e. light with no noticeable degree of directedness, in which case it may be tolerable that control signals provided by the control module for the smart light module and directed at a change in the ambient light, such as a slow modulation in light intensity, are responded to by the smart light module with some delay. In that case, the control module may be adapted to allocate a larger part of the technical resource for a detection function than it would allocate if the delay were not tolerable. A delay might not be tolerable if, for instance, the smart light module is adapted to generate a light output that is not responsible for creation of ambience light, but instead for creation of a main light of a room or a spot light, for instance.

In a preferred embodiment, the information about the smart home device system comprises a location of a smart home device of the smart home device system with respect to the environment of the smart home device system, wherein the allocating unit is adapted to allocate the part of the technical resource based on the location of the smart home device with respect to the environment of the smart home device system. For instance, if the smart home device is a smart light module located outside of an immediate field of view of a user, delays of the smart light module may be tolerable to some extent. The field of view of a user may be the actual or typical field of view of a user as instantaneously measured or recorded over time using measuring devices wearable by the user. Or it may be an expected field of view of the user that the control module is adapted to infer from other information about the smart home device system, that is prestored or that is provided by user input. Also, if the smart home device is located such that there is an increased probability that the detection function delivers undesired results, such as due to a proximity to a door of a room outside of which passengers frequently pass by, the control module may allocate a smaller part of a technical resource for the detection function of the smart home device than it would if the smart home device were located at a place without an increased probability of misdetection, such as far from a door. In an another example, the control module may be adapted to allocate a partial bandwidth of the transceiver of a portable smart home device for the detection only when the portable smart home device is in a predetermined location. Alternatively, portable smart home devices, such as portable smart lights or portable smart switches, may also be excluded from executing the detection function completely.

In a preferred embodiment, the information about the smart home device system comprises a preset characteristic of a smart home device of the smart home device system, wherein the allocating unit is adapted to allocate the part of the technical resource based on the preset characteristic. For instance, the preset characteristic of the smart home device may be indicative of other system information, such as a location of the smart home device or a distance of the smart home device to other smart home devices of the smart home device system. Exemplary preset characteristics of the smart home device comprise naming conventions and possibly associated information or technical specifications of the smart home device.

In an embodiment, the information about the smart home device system can be input by a user and/or may comprise manual indications for the different smart home devices, such as personalized names, or pictures taken of the smart home device system for automatic analysis, wherein the allocating unit is adapted to allocate the part of the technical resource for a function of the smart home device based on the input by the user and/or the manual indications for the different smart home devices.

In an embodiment, the system information providing unit is adapted to provide, as information about the smart home device system, information extracted from a picture of the smart home device system taken by a user, wherein the allocating unit is adapted to allocate the part of the technical resource based on the extracted information. In particular, the extracted information may be a distance between smart home devices.

In a preferred embodiment, the system information comprises a number of control signals provided for the smart home device in a predetermined time, wherein the allocating unit is adapted to allocate the part of the technical resource based on the provided number of control signals. Since the number of control signals provided for a smart home device in a predetermined time is indicative of how intensively the smart home device is used and since delays may be less favorable for smart home devices intensively used, this allows for avoiding unfavorable delays in the smart home device system.

In a second aspect of the present invention, a system is provided that comprises at least one smart home device adapted to execute a function using a technical resource and a control module according to the previous aspect for controlling at least one smart home device of the smart home device system.

In a third aspect, the invention relates to a method for controlling a smart home device of a smart home device system, the method comprising the steps of a) providing information about the smart home device system, b) allocating a part of a technical resource for a function of the smart home device based on the provided information about the smart home device system, and c) controlling the smart home device such that the smart home device uses only the allocated part of the technical resource for executing the function.

In a fourth aspect, the invention relates to a computer program product for controlling a smart home device that is part of a smart home device system according the second aspect, the computer program product comprising program code means that cause a control module according to the first aspect to execute a method according to the third aspect when the control module is controlling a smart home device of the first aspect.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
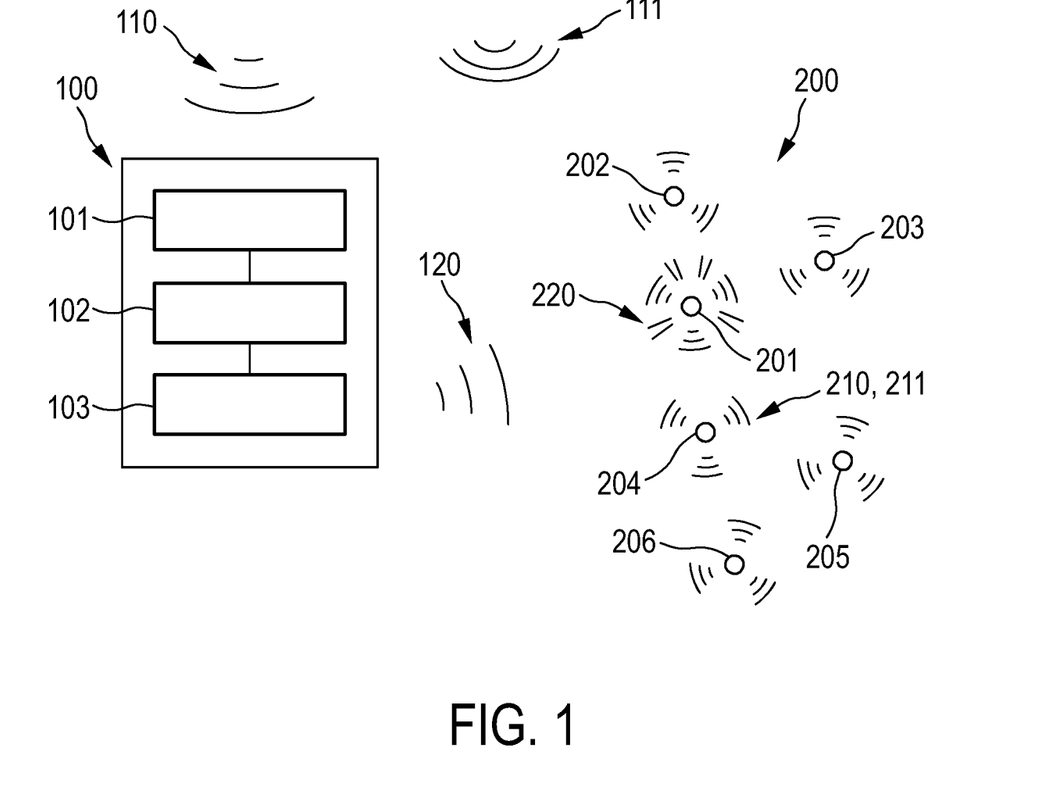
FIG. 1 shows schematically and exemplarily a control module controlling a smart home device of a smart home device system according to the present invention.

FIG. 1 schematically shows an exemplary control module 100 comprising a system information providing unit 101, an allocating unit 102 and a control unit 103. FIG. 1 also shown is a schematic example of a smart home device system 200, which is in this case a smart lighting system with six smart light modules 201-206.

In the particular embodiment illustrated in FIG. 1, the control module 100 receives, via the system information providing unit 101, radiofrequency signals 110 comprising information about the smart lighting system 200. The radiofrequency signals 110 may have been generated by a user device 240 upon input by a user 250.

The control module 100 comprises, in this embodiment, a control module communication unit with a control module transceiver for receiving the radiofrequency signals 110, converting them into electronic form and providing them for further processing within the control module 100, and for transmitting control signals 120 for controlling the smart lighting system 200. The control module transceiver is not shown in FIG. 1.

The system information providing unit 101 receives, in this embodiment, the information about the smart lighting system 200 from the control module transceiver, wherein it provides the information for further processing in the control module 100.

In another embodiment, the information about the smart lighting system 200 is not provided via radiofrequency signals 110, but is provided by the system information providing unit 101 without any user interaction. For example, the system information providing unit 101 may be a storage unit storing the information about the smart lighting system 200.

The allocating unit 102, in this embodiment, receives the information about the smart lighting system 200 and allocates, based thereon, a partial bandwidth of a smart light module transceiver of one or more of the smart light modules 201-206 for a detection function. The control unit 103 accesses, in this embodiment, the control module transceiver for transmitting wireless control signals 120 for controlling the smart light module 201 of the lighting system 200 such that it uses only the allocated partial bandwidth of its smart light module transceiver for executing the detection function. The control signals 120 may be converted by the smart light module transceiver from electronic form to radiation with a radiofrequency.

In some embodiments, the allocation unit 102 is a processing unit adapted to set an internal allocation variable based on the provided information about the smart lighting system 200 and to provide the set internal allocation variable to the control unit 103, wherein the control signals 120 transmitted by the control unit 103 comprise allocation signals indicating to the one or more smart light modules for which the allocation variable has been set that they are to use, for executing the detection function, only the partial bandwidth of their respective smart light module transceiver indicated by the allocation variable. In some embodiments, the control module transceiver may in fact comprise a receiver and a transmitter.

The smart light modules 201-206 each comprise a smart light module communication unit with a smart light module transceiver, or a receiver and a transmitter, for receiving the control signals 120 and for receiving and transmitting communication signals 210 and detection signals 211, and a light unit for generating a light output 220. The smart light modules 201-206 are each adapted to respond to the control signals 120. However, the control signals 120 may indicate that only a particular smart light module 201 is to respond to the control signals 120. For instance, if the allocating unit 102 determines, based on the information about the smart lighting system 200, that only the bandwidth of the smart light module transceiver of the smart light module 201 is to be re-allocated, the control signals 120 may comprise a corresponding indication interpretable by the smart light modules 201-206 upon reception and processing, such that only the smart light module 201 actually responds and re-allocates the bandwidth of its transceiver accordingly.

Also shown in FIG. 1 are user control signals 111, which comprise user control commands generated by a user device 240 upon input of a user. The user control commands indicate a desired change in light output of the lighting system 200 as a whole or of one or more of its smart light modules 201-206. The user control signals 111 may be received by the transceiver of the control module 100 and by the transceivers of the smart light modules 201-206, wherein only either the control module 100 or the smart light modules 200 may be adapted to process the user control commands contained therein. That is to say, the user control commands are either processed by the control module 100, in which case the control module 100 is adapted to effect the desired change in light output 220 by integrating the user control commands into the control signals 120 sent by the control module 100, or the user control commands are processed directly by the smart light modules in order to effect the desired change in light output 220 generated by the light units. Again, the user control signals 111, or the control signals 120 with the user control commands integrated, may indicate that only a particular smart light module 201 is to respond to the user control commands, i.e. that the desired change in light output 220 is a change in light output 220 by the light unit of the smart light module 201 only. In that case, only the indicated smart light module 201 will respond, i.e. will change its light output 220. For instance, if a user has indicated via the user device 240 only that the smart light module 201 is to change its color from sky blue to navy blue, only the smart light module 201 will do so in response to receiving the corresponding user control signals 111 or control signals 110, respectively.

A single control command provided by the user via the user device 240 may initiate a continuous stream of control signals 120 sent out by the control module 100 or, in fact, another smart home device. For instance, if a user indicates via the user device 240 that the light output of a smart light module 220 is to be based on a stream of output signals of a media device, then these output signals may be interpreted as control signals by the smart light module 220. In other words, responsive to user input, a smart light module may listen to media output, such as music or screen content, and base its light output on that media output. For instance, it may synchronize its light output with the media output in time and/or color.

In case the control module 100 is located in a cloud, such as on one or more servers, for instance, it may receive user control signals 111 only indirectly, i.e., for instance, via a router that is set up in the environment of the smart lighting system and that is connected to the Internet.

Figure 2:
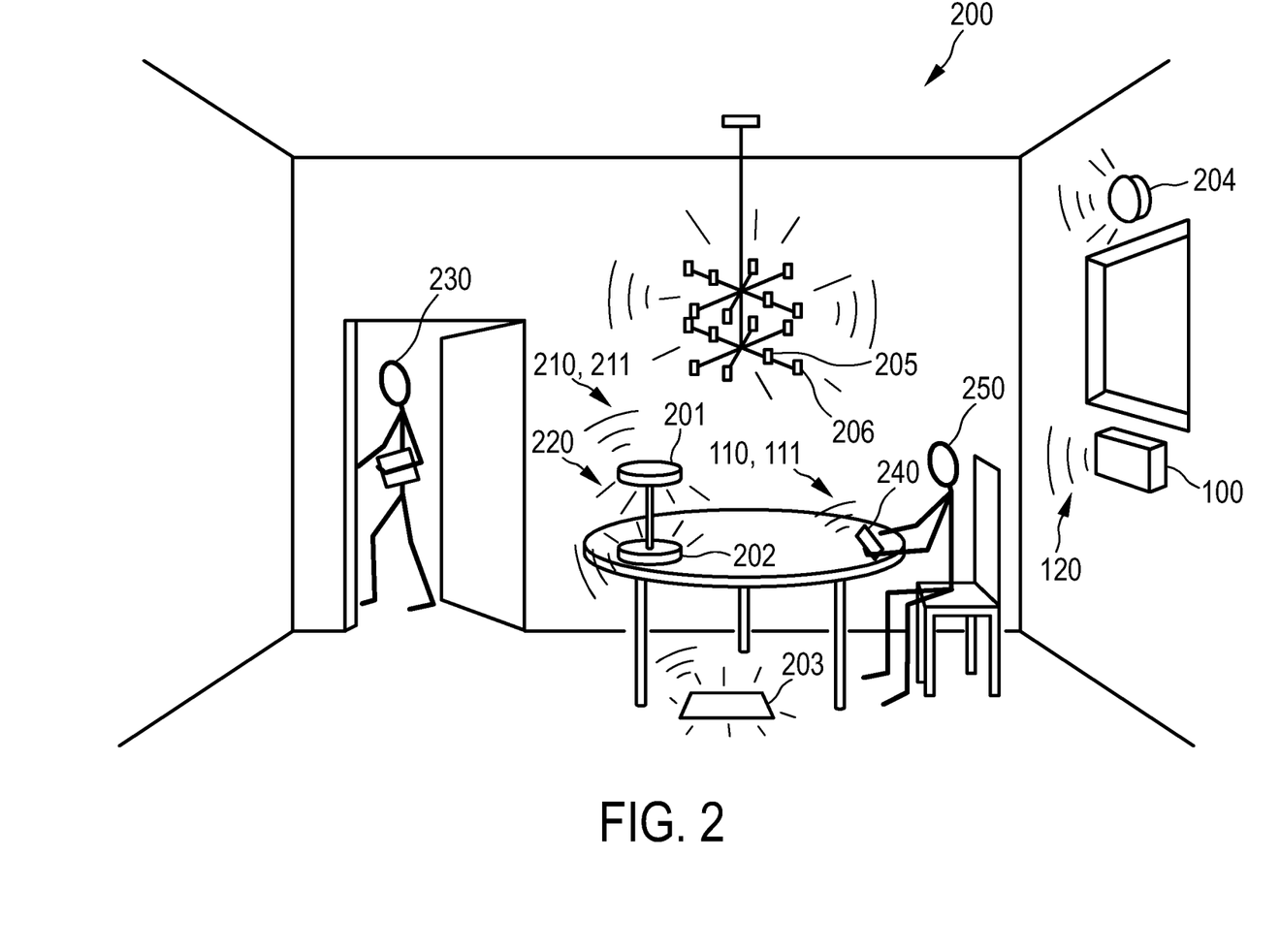
FIG. 2 shows schematically and exemplarily a smart home device system according to the present invention installed in a residential environment.

FIG. 2 schematically illustrates an exemplary smart home device system, namely a smart lighting system 200 installed in a room of a building. In this case, the lighting system 200 comprises a table lamp comprising two electrically coupled smart light modules 201, 202, a smart light module 203 below the table, a smart light module 204 mounted to the wall of the room above a window, and smart light modules 205, 206 of a chandelier hanging from the ceiling of the room above the table. Furthermore, the smart lighting system 200 comprises a control module 100 mounted to the wall of the room. In embodiments where the control module is located in a cloud, reference numeral 100 may alternatively refer to a router connecting the local network to the Internet, and hence to the cloud. Each of the smart light modules 201-206 comprises a smart light module transceiver for receiving and transmitting communication signals 210 and for receiving and transmitting detection signals 211. For instance, each of the smart light module transceivers can transmit detection signals 211 with a predetermined intensity into the room and can receive detection signals 211 transmitted by itself and the smart light module transceivers of the other smart light modules of the smart lighting system 200. Any presence and/or movement in the room will result in variations in intensity of the received detection signals 211 at a smart light module, so that the received detection signals 211 can serve as an indicator for presence and/or movement in the room. Analysis of the received detection signals 211, such as with respect to their intensity, for instance, can be performed locally at each smart light module or globally by the control module 100. Known algorithms may be employed therefor, such as, for instance, those disclosed in the article "Smart radio technology for advanced home automation: A solution for the surveillance" by B. Mrazovac et al., 21st Telecommunications Forum Telfor (TELFOR), pages 420 to 423 (2013).

Execution of the detection function in the smart lighting system 200 may have a considerable impact on the performance of the smart lighting system 200 with respect to, for instance, a reaction speed to user commands input by a user 250 via a user input device 240 and directed at changes in light output 220 by one or more of the smart light modules 201-206, or of the whole smart lighting system 200. Hence, if the system information providing unit 101 of the control module 100 provides information about the smart lighting system 200 indicative of a sub-optimal, i.e. for instance, redundant, allocation of technical resources of any of the smart light modules 201-206 of the smart lighting system 200, the allocation unit 102 may re-allocate parts of the technical resources for the functions executed by the smart light modules 201-206, and the control unit 103 will control the smart light modules 201-206 such that they execute the functions in accordance with this re-allocation.

For instance, in the embodiment illustrated in FIG. 2, the information about the lighting system 200 may comprise a distance between the smart light modules 201, 202, wherein this distance may be below a predetermined threshold since the smart light modules 201, 202 are comprised in a single desk lamp. Therefore, the intensity of detection signals 211 received at any of the smart light modules will not substantially vary if one of the smart light modules 201, 202 no longer transmits detection signals, since the received detection signals 211 transmitted by the smart light modules 201, 202 will not substantially differ from each other due to the proximity of the smart light modules 201, 202. Also, for the same reason, the intensity of the detection signals 211 received by the smart light module 201 will generally be similar or even identical to the intensity of the detection signals 211 received by the smart light module 202. Hence, in order to save technical resources for other than the detection function, the control module 100 may allocate a smaller part of the bandwidth of, say, the smart light module transceiver of the smart light module 202 for the detection function, i.e. for receiving and transmitting detection signals 211, than it does of the bandwidth of the transceiver of the smart light module 201, or even no part at all. In this way, more bandwidth of the smart light module transceiver of the smart light module 202, i.e. a larger part of its technical resource, will be left for communicating by receiving and transmitting communication signals 210, in particular for receiving control signals from the control module 200 or a user device 240.

More generally, in some embodiments, the information about the lighting system 200 comprises a distance of a smart light module 201 to another smart light module 202, wherein, if the distance is below a predetermined threshold, the allocating unit 102 allocates no part of the bandwidth of the smart light module transceiver of one of the smart light module 201, 202 for the detection function, wherein the control unit 103 controls the one of the smart light modules 201, 202 such that it uses no part of the bandwidth of its smart light module transceiver for executing the detection function.

It is also possible that the allocating unit 102 of the control module 100 only slightly decreases, or does not decrease at all, the part of a technical resource allocated for a certain function of a smart light module, i.e. in this case, the partial bandwidth of the smart light module transceiver of the smart light module 202 allocated for transmitting detection signals. In fact, the control module 100 may allocate an increased part of a technical resource for other functions of a smart light module, i.e. in this case, an increased partial bandwidth of the smart light module transceiver of the smart light module 201 for receiving and transmitting communication signals, for instance. In particular, the control unit 103 of the control module 100 may control the smart light module 201 such that it responds to control signals provided for the smart light module 202 if the system information providing unit of the control module has provided information about a delay for the smart light module 202. Preferably, in that case, the smart light module 201 will respond to control signals provided for the smart light module 202 by the control module 100, or to user control signals 111 provided by a user device 240, so as to diminish the effect of the delay of the smart light module 202, i.e., for instance, by mimicking a change in light output 220 that the smart light module 202 would have generated if it had not been delayed. Such a change in light output 220 may, for instance, be directed at a change in light color, light intensity, in hue or saturation brightness, or may be directed at dynamic effects comprising transition and/or fading times.

The control module 100 may also comprise a scheduling unit for determining a time schedule according to which the smart light modules 201, 202 transmit detection signals 211. In this way, the transmission of detection signals 211 may be distributed more evenly among the two smart light modules 201, 202. For instance, each of the two smart light modules 201, 202 may be controlled by the control unit 103 to transceive half of all detection signals transceived by the smart light modules 201, 202 in sum. This may be timed by the time schedule determined by the scheduling unit of the control module 100. For instance, the smart light modules 201, 202 may transceive detection signals 211 alternately, i.e. according to a pattern of the type "1, 2, 1, 2, 1, 2, 1, 2", or of the type "111, 222, 111, 222", wherein a "1" indicates that the smart light module transceiver of the smart light module 201 receives or transmits a detection signal 211 while the smart light module transceiver of the smart light module 202 is free to receive or transmit a communication signal 210, for instance, and a "2" indicates that the smart light module transceiver of the smart light module 202 receives or transmits a detection signal 211 while the smart light module transceiver of the smart light module 201 is free to receive or transmit a communication signal 210, for instance. Any other pattern can be implemented according to any desirable load distribution, i.e., for instance, 10 to 90%, 20 to 80%, 30 to 70%, etc.

The information about the smart lighting system 200 based on which the allocating unit 102 of the control module 100 allocates a part of a technical resource, such as a partial bandwidths of the smart light module transceivers of one or more of the smart light modules, for instance, may also comprise information about a lighting function of one or more of the smart light modules of the smart lighting system 200 within the lighting system 200. The information about the lighting function within the lighting system is particularly useful for identifying the purpose of the one or more smart light modules served in the smart lighting system. For instance, a smart light module may be used for creating ambiance light, in which case its function in the smart lighting system may be referred to as "ambiance". Its light output characteristics will differ from a smart light module predominantly serving a more pragmatic purpose, such as providing a main illumination of a room. The smart lighting function of a smart light module providing the main illumination in a room may be referred to as "main". A delay in a smart light module providing the main illumination of a room is typically less tolerable than a delay in a smart light module providing ambient light. In the embodiment shown in FIG. 2, the smart light module 204 provides a main illumination of the room, and the smart light module 203 provides ambient light. Therefore, the allocating unit 102 of the control module 100 may allocate a part of the technical resource of the smart light module 204, i.e. a partial bandwidth of its smart light module transceiver, for the detection function that is smaller than a part it allocates of the technical resource of the smart light module 203, i.e. a larger partial bandwidth of its smart light module transceiver, for the detection function. This is particularly favorable since, in this embodiment, the smart light module 203 is located outside of the immediate field of view of the user 250 most of the times anyway due to its location below the table, so that, even if the smart light module 203 were delayed, this may not be noticeable by the user 250. For instance, 70% of the maximum bandwidth of the smart light module transceiver of the smart light module 203 may be allocated for the detection function, whereas only 30% of the maximum bandwidth of the smart light module transceiver of the smart light module 204 may be allocated for the detection function. Allocations of this type allow for a non-decreased performance with respect to the detection function of the lighting system 200 without any delays in reactions to user control commands noticeable to the user 250.

If several smart light modules form part of the same luminaire, it may be desirable that all of them respond to control signals provided for the luminaire simultaneously, i.e. with the same delay, and preferably with no noticeable delay at all. Hence, the allocating unit 102 may be, for instance, adapted to allocate the technical resource for a function of each of a set of smart light modules based on the information that this set of smart light modules is part of the same luminaire, such as a chandelier, wherein this information may be provided by the system information providing unit 101. For instance, the partial bandwidths of the smart light module transceivers of each of a set of smart light modules belonging to the same luminaire that are allocated for the communication function may be chosen to be sufficiently large that control signals can always be responded to without or substantially without delay by these smart light modules.

The allocating unit 102 of the control module 100 may also be adapted to allocate a part of a technical resource for a function of one or more of the smart light modules 201-206 based on a current light scene and the state of other smart light modules in the room. For instance, a delay of the smart light module 204 may be less noticeable to the user 250 at daylight due to its immediate vicinity to the window and the blinding effect to the user 250 caused by the daylight entering the room via the window, whereas at night, the smart light module 204 may be the predominant source of light in the room, so that any delayed reactions to user control commands will be immediately noticeable. Hence, for instance, the partial bandwidth allocated for the detection function in the smart light module transceiver of the smart light module 204 may be chosen smaller at night than during the day.

In some situations, the system information provided by the system information providing unit 101 of the control module 100 may not be immediately known, but needs to be provided by the user 250 or acquired by the smart lighting system 200 itself. Provision by the user 250 or acquisition by the smart lighting system 200 may also be necessary if the system information needs to be updated. This is the case, for instance, in modular luminaires such as a chandelier, into each of whose sockets a standard smart light bulb can be fitted. The distance between any two smart light bulbs 205, 206 of the chandelier is not initially known, but needs to be learnt by the system. One possibility is that the user 250 has indicated telling names for each of the smart light bulbs of the chandelier via the user input device 240, such as "chandelier 1" for smart light bulb 205 and "chandelier 2" for smart light bulb 206, in which case the control module 100 may infer that the smart light bulbs 205, 206 are part of the same luminaire, namely the chandelier, and hence at least not separated from each other by more than a largest distance between the sockets of the chandelier. The user 250 may also be asked to provide distinct information on grouping of smart light modules. This may be simplified by providing the possibility to simply provide pictures of parts of the smart lighting system 200, such as the chandelier, which are then automatically analyzed by the control module 100 for identifying whether a distance between any two smart light modules 205, 206 is below a predetermined threshold, in which case the two smart light modules 205, 206 can be functionally grouped and treated similarly as the smart light modules 201, 202 of the lamp on the table. It may also be determined by the control module 100 that there is only little variance between detection signals 211 received at, say, the two smart light modules 205, 206, in which case it may be determined that these two smart light modules are separated by a distance below a predetermined threshold, i.e. that these smart light modules can be functionally grouped and treated similar to the smart light modules 201, 202 of the lamp on the table.

The system information may also comprise preset characteristics of the smart light modules. In the case of the chandelier, such preset characteristics may include light output capabilities of the smart light modules. For instance, candle-inspired smart lights typically have a lower light output than A19 bulb-inspired smart lights, so that delays for the candle-inspired smart light bulbs may be less noticeable to a user 250 than delays in the A19 bulb-inspired smart lights. Hence, the allocating unit of the control module 100 may be adapted to allocate a larger partial bandwidth for the detection function for the smart light module transceiver of a smart light module with a typically lower output than it would allocate for the smart light module transceiver of a smart light module with a typically higher light output. Also, since the smart light module 206 may be typically less visible to a user 250 than the smart light module 205 due to its position closer to the center of the chandelier, the allocating unit of the control module 100 may allocate a larger partial bandwidth for the detection function for the smart light module transceiver of the smart light module 206 than it allocates for the smart light module 205. In this way, even if the higher load of the smart light module 206 leads, due to its use for the detection function, to delays in light output from the smart light module 206, these delays might not be noticeable to the user, or at least not as noticeable as they would be in the smart light module 205. Similar choices of the smart light module that is to execute the detection function more extensively are applicable to panel based luminaires, where it might be favorable to pick a smart light module on the border rather than a smart light module in the center of the panel for more extensively executing the detection function.

The preset characteristics may also include the spectral properties of the light output of a smart light module. For instance, if a smart light module is only capable of emitting white light, it will be less likely to be subject to user control commands than a smart light module that is capable of changing its emitted light color. Hence, the candle-inspired smart lights of the chandelier might therefore be also favorable for executing the detection function as compared to the A19 bulb-inspired smart lights of the chandelier, which can be changed in color, while the candles are white only. This example shows that preset characteristics can be an indicator for a likelihood of interaction of the smart light module with an external system, such as a user device 240. Other examples are however possible. For instance, the system information may include statistics about past user interactions with the smart light module.

The system information may also comprise a location of one or more of the smart light modules with respect to the environment of the lighting system, such as the room illustrated in FIG. 2. For instance, the system information may in this case indicate that the smart light module 204 is located further away from the door than all the other smart light modules 205, 206, 201, 202 and 203. The allocation unit of the control module may therefore be adapted to allocate a larger partial bandwidth of the smart light module transceiver of the smart light module 204 for the detection function than it does for any of the other smart light modules. Since the risk of misdetection, i.e. the likelihood of responding to detection of movements that are not meant to cause detections, such as other people 230 passing by the door outside of the room, is higher for smart light modules closer to the door, this manner of allocation leads to a more stable detection function. Moreover, windows are typically located far from doors of a room as well, so that, as described above, the proximity of a smart light module to the window makes it even more favorable for executing the detection function, due to the tolerability of delays. This manner of allocation may also be applicable to a scenario where multiple smart light modules are arranged linearly above a table of a meeting room oriented such that one head of the table is close to the entrance of the meeting room and the other one is close to the window (not shown in FIG. 2). The smart light module transceivers of the smart light modules may then have increasing partial bandwidth allocated for the detection function as the smart light modules get closer to the window.

In an embodiment, the control module is adapted to estimate an effect that allocating a part of a technical resource of a smart home device for a function of the smart home device will have on the performance of the smart home device or the smart home device system, wherein if the effect is such that the performance will be decreased by a predetermined or noticeably amount, a notification is provided to a user. For instance, the estimated effect may be based on the function itself, and the notification may be provided to a user device via which the user is controlling the smart home device system. The notification may comprise information about which other functions of the smart home device system will be affected in performance and/or prompting the user to confirm that the function is to be executed. The user may also be allowed to set a priority list indicative of the priority of functions of the smart home device system, which may be time-dependent. For instance, for a smart home device adapted to execute a detection function and a lighting function contributing to a use comprising dynamic light effects, such as for entertainment purposes, the priority list may determine that the detection function is prioritized lower than the lighting function after 8 p.m. during weekdays, but higher than the lighting function before 8 p.m. over the weekend. The control module may be adapted to not allow a smart home device to execute a function prioritized lower than another function if the control module estimates that executing the lower prioritized function would negatively affect the performance of the smart home device or the smart home device system with respect to the other function.

Figure 3:
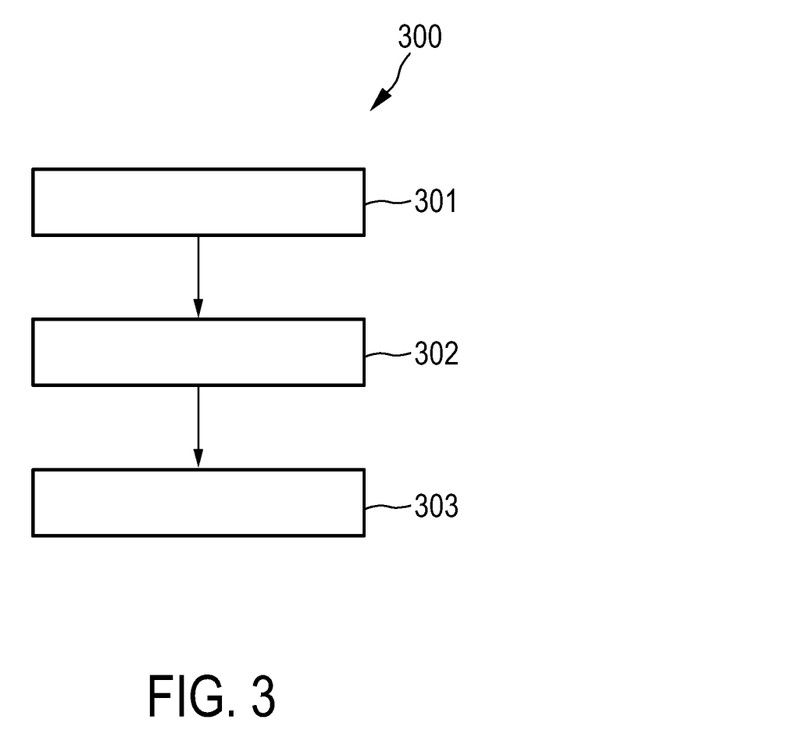
FIG. 3 shows a flowchart schematically illustrating a method for controlling a smart home device of a smart home device system according to the present invention.

FIG. 3 schematically illustrates a method for controlling a smart home device of a smart home device system according to the invention. In a first step 301, which may be abbreviated by "providing system information", information about the smart home device system is provided. The information about the smart home device system 200 may be of a kind as described above. In a second step 302 of the method 300, which may be abbreviated by "allocating resource", a part of a technical resource is allocated based on the provided information about the lighting system 200. In a third step 303, which may be abbreviated by "controlling accordingly", the smart light module 201 is controlled such that the smart light module 201 uses only the allocated part of the technical resource for executing the function.

The present invention refers to different ways of effectively, and possibly temporarily, distributing functions among sets of smart home devices of a smart home device system, such as groups of lamps, multisource luminaires and clustered lights as in chandeliers, if technical resources are limited, such that an overall performance of the lighting system is not noticeably decreased, i.e., for instance, an ambiance is retained. These strategies of distribution are particularly relevant for radio detection functions, whose low latency and high accuracy requirements imply a high load of technical resources, such as a high additional network traffic or CPU utilization.

Although in the above described embodiments the smart home devices have been smart light modules, as far as the communication function and the detection function is concerned, the smart home devices could equally well be smart plugs, smart switches or other smart home devices. In fact, the smart light modules described may be a conventional light module connected to a smart plug or controlled by a smart switch. A smart home device system according to the present invention may also be of a mixed type, i.e. comprising smart light modules per se, smart light modules formed by conventional modules and a smart plug or smart switch, and further smart home devices, such as any appliance having a communication function as disclosed herein.

Although in the above described embodiments the control module is a separate module of the smart home device system that controls more than one smart home device of the smart home device system, in other embodiments of the invention the control module may be integrated in one of the smart home devices of the smart home device system and/or may control only one smart home device of the smart home device system, such as, for instance, the smart home device into which it is integrated.

Although in the above described embodiments one control module is adapted to control the smart home devices of the smart home device system, in other embodiments of the invention, more than one control module may be used for controlling the smart home devices of the smart home device system, such as, for instance, one control module per smart home device, wherein the control modules may be integrated in the smart home device or not.

Although in the above described embodiments the technical resource is a transceiving rate of the transceiver of the smart home device, other technical resources subject to allocation by the allocating unit of the control module include more generally a communication speed of a smart home device, a processing speed of a smart home device, a power consumption of a smart home device, available idle and/or busy time of a smart home device, an overall network traffic of the smart home device system, or any combination of these.

Although in the above described embodiments the function for which parts of the technical resource are being allocated by the allocating unit is a detection function, other choices for this function include additional communication between the control module and the smart home device concerned, for instance, with additional light output effects, particularly dynamic effects in the case of smart light modules. The technical resource allocated for such a light effect function of a smart light module may be any of the above mentioned ones.

In some variations to the disclosed embodiments, the control module and/or any of the smart home devices of the smart home device system may be adapted to selectively transmit, via their respective transceivers, the communication signals, the detection signals and/or any other signals according to more than one communication standard, i.e., for instance, according to one or more of the disclosed communication standards. For example, the detection function as disclosed may be executed using the ZigBee standard, while another communication standard may be used to transmit shorter beacons to detect a location of portable devices that can read these beacons.

In some variations to the disclosed embodiments, the allocating unit or the scheduling unit of the control module may be adapted to set an interleave time for the communication function, the detection function and/or any other function of a smart home device, wherein the interleave time is indicative of a periodically repeating pause time during which the respective function is not executed by the smart home device. For example, the interleave time is set based on a measured temperature of the smart home device, in which case the set interleave time increases with measured temperature. In this way, the smart home device may be prevented from overheating. In the case of a smart light module, the interleave time may be set for the lighting function and be indicative of a pause in light output of the smart light module, wherein the interleave time may be set such that it is sufficient for a light sensor of the smart light module to measure a light output of other smart or conventional light modules in the environment of the smart home device system.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Procedures like the providing of information about the smart home device system, the allocating of a part of a technical resource, the controlling of a smart home device such that it uses only the allocated part of the technical resource for executing a function, et cetera, performed by one or several units or devices can be performed by any other number of units or devices. These procedures can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The present invention relates to a control module for controlling a smart home device, wherein the smart home device is part of a smart home device system. The control module comprises a system information providing unit for providing information about the smart home device system, an allocating unit for allocating a part of a technical resource for a function of the smart home device based on the provided information about the smart home device system, and a control unit for controlling the smart home device such that the smart home device uses only the allocated part of the technical resource for executing the function. Thus, the smart home device system can be endowed with the function without noticeably affecting other, in particular preferred, functions of the smart home device system.

The invention claimed is:

1. A control module for controlling a smart home device comprising a transceiver, wherein the smart home device is adapted to receive and transmit communication signals and detection signals via the transceiver, wherein the communication signals comprise control signals, and the detection signals are received and transmitted for executing a presence detection function, comprising presence detection in an environment of a smart home device system, wherein the smart home device is part of the smart home device system, the control module comprising:
   a system information providing unit for providing information about the smart home device system,
   an allocating unit for allocating a part of a transceiving rate of the transceiver for the presence detection function of the smart home device based on the provided information about the smart home device system, and
   a control unit for controlling the smart home device such that the smart home device uses only the allocated part of the transceiving rate for executing the presence detection function,
   wherein the information about the smart home device system comprises information about a spatial arrangement of the smart home device system, wherein the allocating unit is adapted to allocate the part of the transceiving rate based on the information about the spatial arrangement.

2. The control module according to claim 1, wherein the control module further comprises a scheduling unit for determining a time schedule according to which the smart home device is to execute the presence detection function, wherein the control unit is adapted to control the smart home device such that it executes the presence detection function in accordance with the time schedule.

3. The control module according to claim 1, wherein the control module further comprises a variance determining unit that is adapted to determine a relative or absolute variance in the detection signals received by a smart home device, wherein the information about the smart home device system comprises this relative or absolute variance, wherein the allocating unit is adapted to allocate the part of the transceiving rate based on the determined relative or absolute variance.

4. The control module according to claim 1, wherein the information about the smart home device system comprises information about a delay between a control signal provided for the smart home device and a corresponding response by the smart home device, wherein the allocating unit is adapted to allocate the part of the transceiving rate based on the information about the delay.

5. The control module according to claim 1, wherein the information about the smart home device system comprises information about a delay between a control signal provided for another smart home device of the smart home device system and a corresponding response by the other smart home device, wherein the control unit is adapted to control the smart home device so as to respond to control signals provided for the other smart home device based on the information about the delay of the other smart home device, wherein the response is such that it diminishes an effect of the delay of the other smart home device on an overall performance of the smart home device system.

6. A system comprising:
   at least one smart home device comprising a transceiver, wherein the smart home device is adapted to receive and transmit communication signals and detection signals via the transceiver, wherein the communication signals comprise control signals, and the detection signals are received and transmitted for executing a presence detection function, and
   a control module according to claim 1 for controlling at least one smart home device of the smart home device system.

7. A method for controlling a smart home device comprising a transceiver, wherein the smart home device is adapted to receive and transmit communication signals and detection signals via the transceiver, wherein the communication signals comprise control signals, and the detection signals are received and transmitted for executing a presence detection function, comprising presence detection in an environment of a smart home device system, wherein the smart home device is part of the smart home device system, the method comprising the steps of:
   providing information about the smart home device system,
   allocating a part of a transceiving rate of the transceiver for the presence detection function of the smart home device based on the provided information about the smart home device system, and
   controlling the smart home device such that the smart home device uses only the allocated part of the transceiving rate for executing the presence detection function,
   wherein the information about the smart home device system comprises information about a spatial arrangement of the smart home device system, wherein the allocating comprises allocating the part of the transceiving rate based on the information about the spatial arrangement.

8. A non-transitory computer readable medium comprising instructions, the instructions when executed by a smart home device that is part of a smart home device system cause the smart home device to perform the method of claim 7.

* * * * *